(No Model.) 3 Sheets—Sheet 3.
V. BÉLANGER.
CHANGE SPEED MECHANISM.
No. 605,845. Patented June 21, 1898.
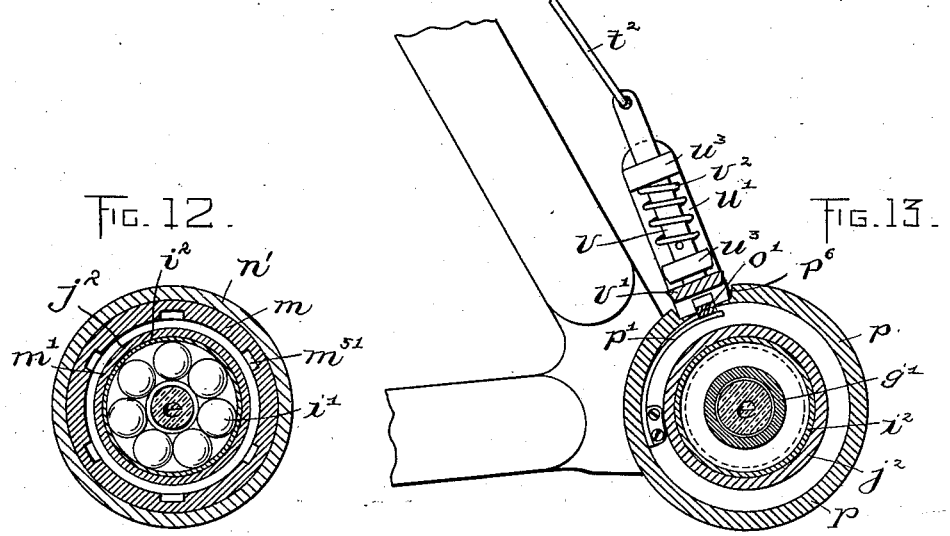
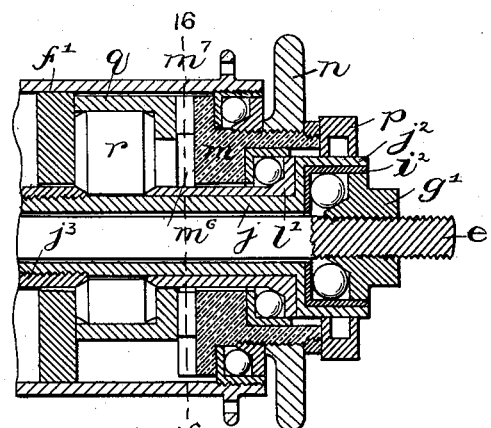
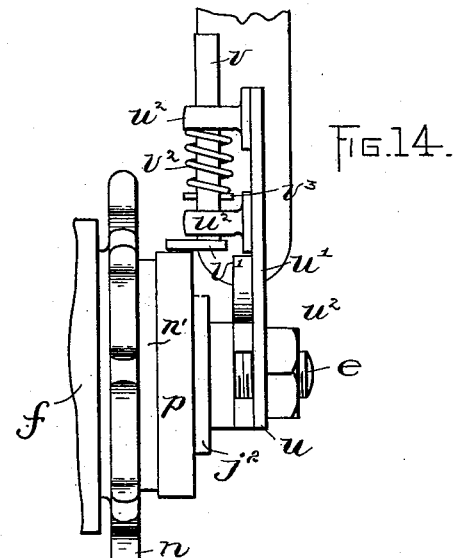
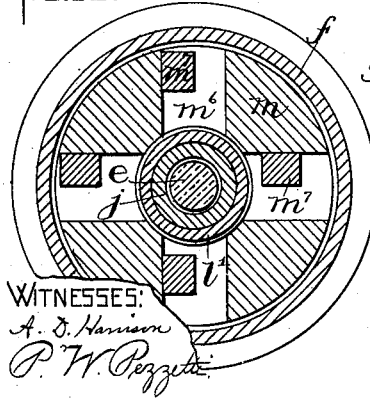
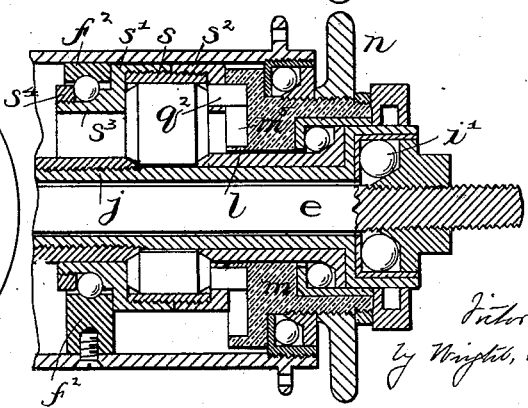
WITNESSES:
A. D. Harrison
P. W. Pezzetti
INVENTOR:
Victor Bélanger
by Wright, Brown & Quinby
Attys.

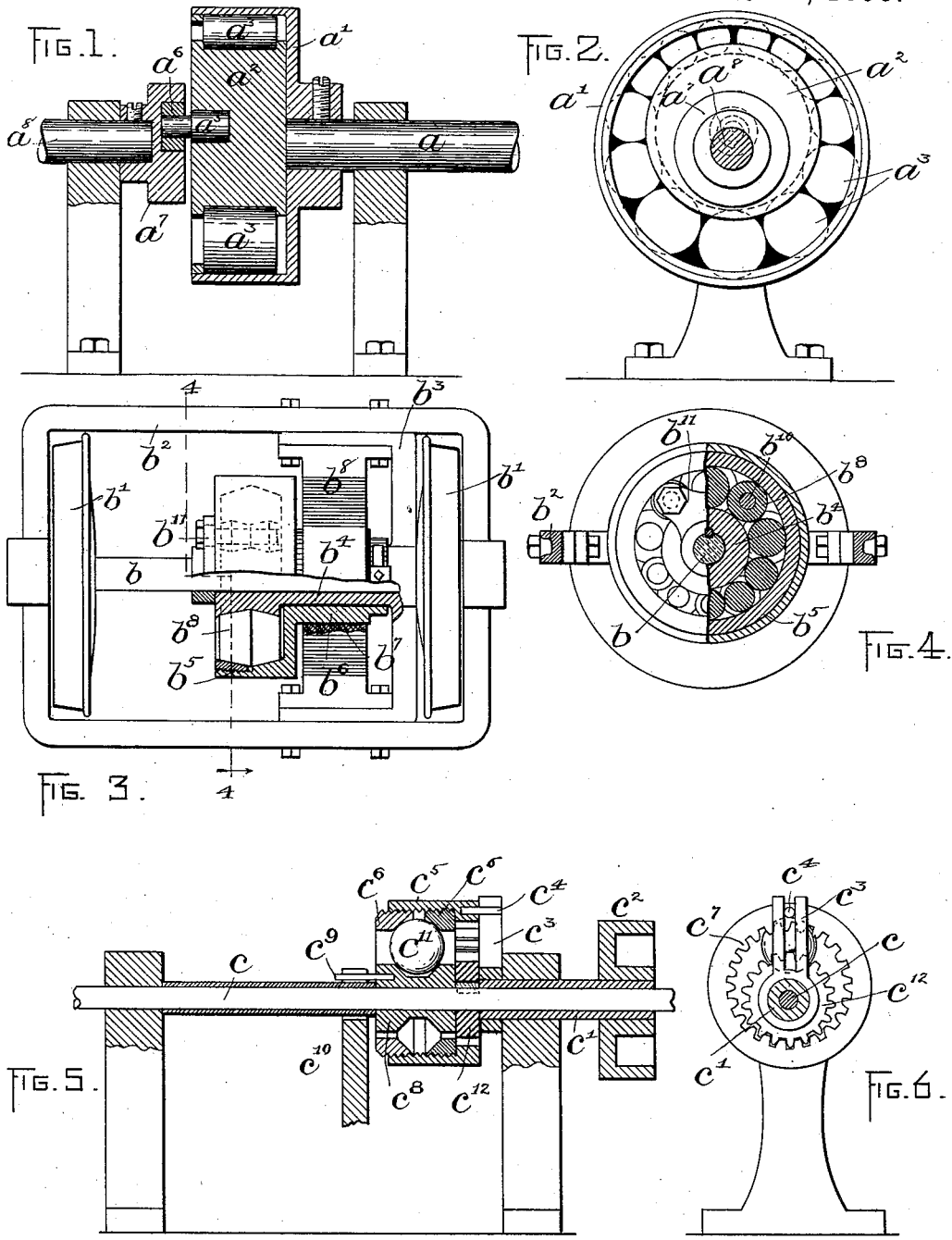

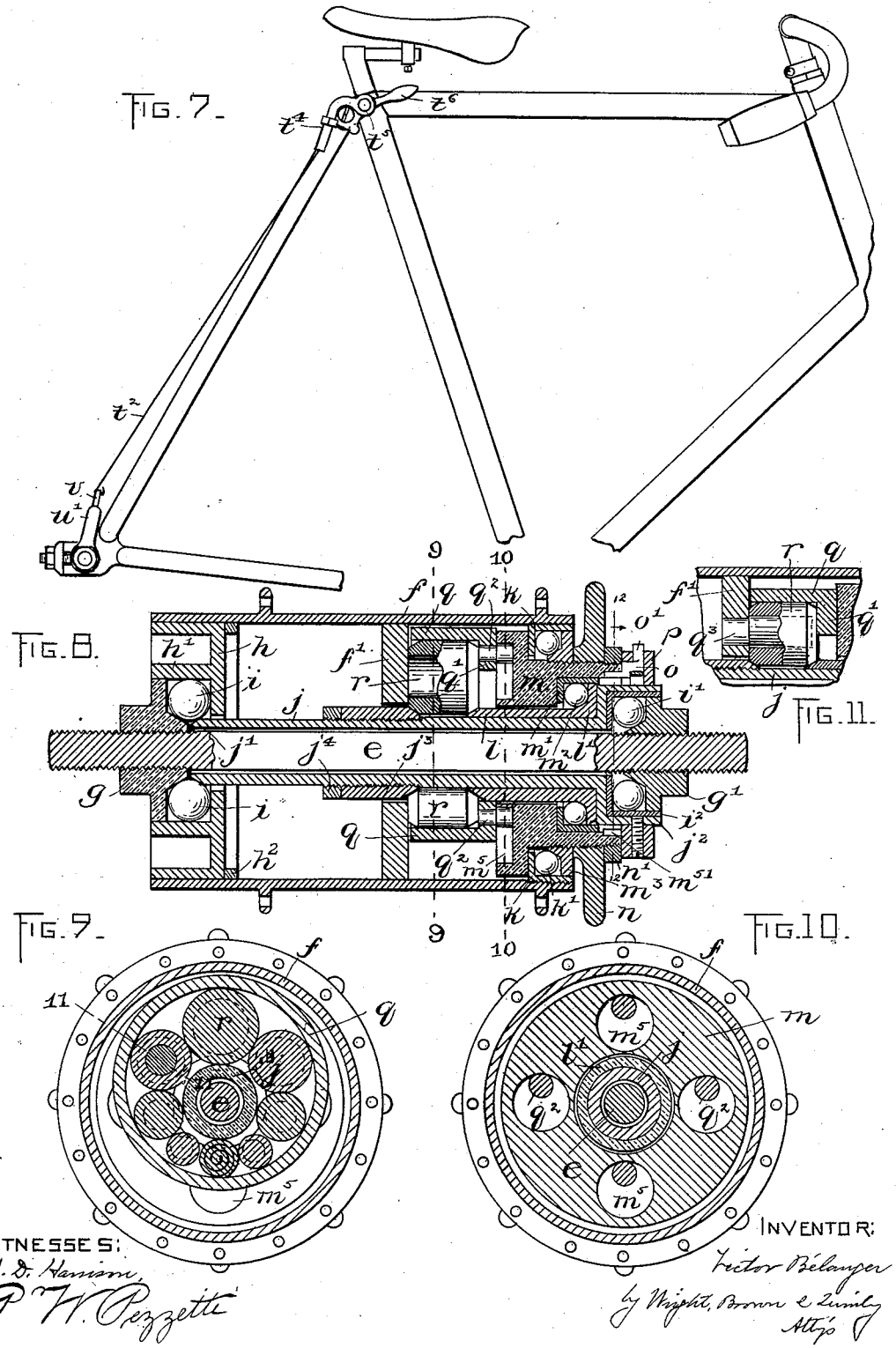

UNITED STATES PATENT OFFICE.

VICTOR BÉLANGER, OF BOSTON, MASSACHUSETTS, ASSIGNOR TO JOSIAH QUINCY, TRUSTEE, OF SAME PLACE.

CHANGE-SPEED MECHANISM.

SPECIFICATION forming part of Letters Patent No. 605,845, dated June 21, 1898.

Application filed November 1, 1897. Serial No. 657,017. (No model.)

*To all whom it may concern:*

Be it known that I, VICTOR BÉLANGER, of Boston, in the county of Suffolk and State of Massachusetts, have invented certain new and useful Improvements in Change - Speed Mechanism, of which the following is a specification.

This invention has relation to mechanical movements, and has for its object to provide, first, novel and improved mechanism for transmitting movement from a driving member to a driven member; second, new and improved mechanism for changing the speed of the driven member at will without changing the speed of the driving member.

This invention is of great utility when embodied in the driving mechanism of vehicles of various kinds—such as motor-carriages, railway-cars, bicycles, tricycles, &c.—and especially when embodied in the driving mechanism of those vehicles in which it is necessary or desirable to impart movement to the driven member from the driving member at a greater or a reduced rate of speed or to vary from time to time the speed of the driven member; and accordingly the invention consists in a new and useful mechanical movement and the embodiment of the same in change-speed driving mechanism for vehicles.

The invention likewise consists in certain features of construction and arrangement, as hereinafter set forth.

Reference is to be had to the accompanying drawings, and to the letters marked thereon, forming a part of this specification, the same letters designating the same parts or features, as the case may be, wherever they occur.

Of the drawings, Figures 1 and 2 represent an embodiment of the invention, this mechanism having been selected for the purpose of illustrating the invention in one of its simplest forms. Figs. 3 and 4 represent another embodiment of the invention in which the rotation of the driven member is obtained by connecting it with one of the antifriction-rolls employed in the said mechanism. Figs. 5 and 6 illustrate a more highly developed form of the invention in which the speed of the driven part may be varied at will, so that it will rotate either in unison with the driving member or at a different rate of speed therefrom. Fig. 7 represents a portion of the bicycle with a still more highly developed form of the invention applied to the rear driving-wheel. Fig. 8 represents in vertical longitudinal section a bicycle-hub equipped with an improved change-speed mechanism. Figs. 9 and 10 represent transverse sections on the lines 9 9 10 10, respectively, of Fig. 1. Fig. 11 shows in detail means for connecting one of the antifriction-rollers with the driven member or bicycle-hub. Fig. 12 represents a transverse section on the line 12 12 of Fig. 1. Figs. 13 and 14 represent in detail the means for causing a change of speed of the driven member or hub. Figs. 15, 16, and 17 represent other forms or embodiments of the invention.

Referring first to Figs. 1 and 2, $a$ indicates a rotary shaft to which power is applied by any convenient means from a suitable source. Upon the said shaft is secured a driving member which in this embodiment of the invention consists of a cylindrical cup or shell $a'$. Within the shell is placed a cylindrical disk $a^2$, held eccentrically therein by means of a series of graded antifriction-rolls $a^3$. These rolls are graded or, in other words, vary in diameter from large to small, and they are freely revoluble about the axis of the driving member. Projecting out from the center of the eccentric $a^2$, which I term in this embodiment of the invention a "driven" member, is a pin $a^5$, having a trundle $a^6$ extending into an aperture in the crank $a^7$ upon the end of a shaft $a^8$ in axial alinement with the shaft $a$. Power being applied to the driving member its rotation will cause the driven member to rotate at a slower rate of speed in the following manner: The peripheries of the loosely-mounted rolls frictionally engage the inner wall of the cup or shell $a'$, so that as the shell rotates they are caused to rotate on their own axes and to roll or revolve about the axis of the driving member, and by reason of their being graded they operate in the nature of a wedge to cause the eccentric $a^2$ to revolve about the axis of the said driving member at a relatively slow rate of speed and the motion of the said eccentric is imparted to the driven member $a^8$ through the medium of the pin $a^5$, as will be readily understood. In this embodiment of the invention it is not essential whether the eccentric rotates upon its own axis or not.

In Figs. 3 and 4, however, I have illustrated another embodiment of the invention which is applicable for use on such vehicles as railway-cars. In these figures $b$ indicates an axle, to the ends of which are secured wheels $b'$ $b'$, the flanges of which fit upon the rails. This axle is suitably journaled in bearings mounted on a truck $b^2$ in the well-known way. Rigidly secured to the truck is a bracket $b^3$, provided with a sleeve $b^4$, concentric with the axle and through which the latter loosely passes. Loose upon the said sleeve is a driving member $b^5$, which in this embodiment of the invention is an eccentrically-arranged cup or shell having a hub $b^6$, upon which may be secured an armature $b^7$ of any suitable electric motor $b^8$, or to which power may be transmitted from the motor in any desired way. Between the inner walls of the shell and the external wall of the sleeve $b^4$ is placed a series of antifriction-rolls $b^9$, which are of different diameters or graded and which may be maintained in place in any desired way. Projecting out from the rolls on each side of the largest roll are axially-extending pins $b^{10}$, secured to an arm $b^{11}$, keyed or otherwise secured to the shaft or axle $b$. By means of this form of the invention power may be applied from the driving member to the driven member having the arm $b^{11}$ through the medium of the rolls $b^9$, which are caused to revolve about the sleeve $b^4$ by reason of their frictional engagement with the rotating driving member $b^5$, which in this case is eccentrically arranged. It will be observed that I have stated that the pins $b^{10}$ extend into rollers on each side of the largest roll. Now as the driving member rotates the largest roll operates in the nature of a wedge to cause the said shell or driving member to revolve about the axis of the axle, and therefore the roll which follows it has more or less play and is free to rotate. My reason therefore for employing the two pins and rollers, one on each side of the large roll, is that there will be one roll which is free to rotate and drive the axle irrespective of the direction of the movement of the car. I may here state that the hub of the driving member is loose upon the sleeve $b^4$, around which the rolls travel, and it is supported entirely by the said rolls, there being sufficient space between said hub and said sleeve to permit the said driving member to revolve as an eccentric.

Next referring to Figs. 5 and 6, I have illustrated another step in the invention by means of which I am enabled to change the speed of the driven member without changing the speed of the driving member.

In the drawings, $c$ indicates a driven member which consists of a shaft mounted in suitable bearings, and having on one end a sleeve $c'$ rotatable thereon and driven by a belt $c^2$. This sleeve is provided with an arm $c^3$, secured thereto, which is slotted to receive a pin $c^4$, extending out from a cylindrical shell $c^5$. This cylindrical shell is eccentrically arranged with respect to the driven member, and it is formed with interior bearing-cones $c^6$ $c^6$ and with internally-projecting gear-teeth $c^7$. The grooved sleeve $c^8$ is mounted loosely upon the shaft $c$ and is provided with an outwardly-projecting pin $c^9$, which may be engaged by a fork $c^{10}$. Between the eccentrically-arranged shell $c^5$ and the sleeve $c^8$ are placed antifriction-balls $c^{11}$ of varying diameters, which maintain the said shell in its eccentrical relationship with respect to the driven member. Keyed to the shaft $c$ is a pinion $c^{12}$ in mesh with the gear-teeth on the eccentric-shell. When the fork $c^{10}$ is withdrawn, so that the bearing or sleeve $c^8$ is no longer held against rotation, the rotation of the eccentric-shell $c^5$, through the medium of the belt-wheel $c^2$, the sleeve $c'$, the arm $c^3$, and the pin $c^4$, will cause the ball $c^{11}$, the said sleeve or bearing $c^8$, the pinion $c^{12}$, and the shaft $c$ to all revolve in unison about the axis of the said shaft. By engaging the pin $c^9$ with the fork $c^{10}$ and holding the bearing $c^8$ stationary the rotation of the eccentric-shell causes the balls to roll around the said bearing slowly, and hence the revolution of the eccentric is retarded, although the rotation thereof is not affected. This causes the teeth of the shell to successively engage the teeth of the pinion, so that the said pinion is driven at the rate of speed of the sleeve $c'$ plus the speed acquired by the partial rotation given the said pinion by successively engaging the teeth $c^{12}$ by the eccentric therewith. Therefore in this instance by holding the bearing-sleeve against movement the revolutions of the eccentric and the rotations of the driven member may be varied without affecting the speed of the driving member.

In Figs. 7 to 17, inclusive, I have illustrated a highly-developed form of the invention applied to the rear driving-wheel of a bicycle. In Fig. 7 I have shown a portion of the rear frame of a bicycle on which is supported the spindle $e$, upon which the hub $f$ of the wheels rotates. The spindle is threaded on its ends to receive two nuts $g$ $g'$, which are beveled on their inner faces to form bearing-cones. In one end of the hub $f$ is forced or secured a ring $h$, having a flange $h'$, between which and the conical nut $g$ the antifriction-balls $i$ are maintained. The ring $h$ is held against inward movement by a collar $h^2$, which is forced into the hub and secured therein in any desired way. A sleeve $j$ is placed upon the spindle, and its beveled end $j'$ presses against the antifriction-balls $i$, as shown, its other end being enlarged or swelled to form a raceway for the antifriction-balls $i'$, which are placed between it and the conical nut $g'$. A shell or bearing-ring $i^2$ is placed in the enlarged end $j^2$ of the sleeve $j$ and is formed of very hard steel to withstand the wear of the antifriction-balls, so that the sleeve itself may be formed of relatively soft metal. Between its ends the hub is provided with an internal flange or ring $f'$, rigidly secured therein, and its end opposite the ring $h$ is threaded to receive a bearing-ring $k$. Upon the sleeve $j$ is forced or secured in any desired way a bearing-sleeve $l$, having a flange $l'$ to form a cone. Supported in antifriction-bearings upon this sleeve $l$ is a cup-shaped sleeve $m$, having a hardened bearing-ring $m'$ opposite the cone $l'$, and between which and the said cone are placed antifriction-balls $m^2$. The said cup-shaped sleeve $m$ is externally threaded to receive a bearing-cone $m^3$, which is opposite the bearing-ring $k$, and between the latter are placed antifriction-balls $k'$. Upon the said threaded end of the sleeve $m$ is also screwed a sprocket-wheel $n$, which I term the "driving member," and which is locked thereon by a lock-nut $n'$. The outer end of the said sleeve $m$ is formed with a series of internal teeth or notches $m^{51}$ to receive the inwardly-projecting finger of a locking-clutch $o$, mounted in an internally-grooved ring $p$, rigidly secured upon the projecting and enlarged end $j^2$ of the sleeve $j$. The said clutch has a pin or projection $o'$ projecting upwardly through an aperture in the said ring $p$, the inwardly-projecting finger thereon being normally held in engagement with one of the notches in the sleeve $m$ by a leaf-spring $p'$, secured in the groove in said ring $p$. The inner end of the sleeve $m$ is formed with a radial flange, and the inner face thereof is provided with a series of round or cylindrical apertures $m^5$, equally disposed about its axis and at equal distances therefrom. Between the end of the said sleeve $m$ and the said flange or ring $f'$ in the hub is a ring $q$, arranged eccentrically with regard to the hub and the spindle and held in position by a series of antifriction-rolls $r$, all varying in diameter and graded from large to small, as shown in Fig. 9. The said eccentric-ring $q$ is provided with an inwardly-projecting flange $q'$, from which pins $q^2$ project axially into the said apertures $m^5$, as shown in Fig. 10. A pin or stud $q^3$ is secured in the ring or flange $f'$ and projects into an axial aperture in the largest one of the rolls, as shown in said Fig. 9. A bearing-cone or beveled sleeve $j^3$ is screwed upon the sleeve $j$ and is held in place by a lock-nut $j^4$. The end of this cone or sleeve is arranged opposite to the beveled end of the sleeve $l$, and the ends of the rolls $r$ are beveled, so as to rest against the said ends, which thus constitute a bearing rigid with the sleeve $j$, the central parts of their peripheries pushing against the eccentric $q$. Instead of the sleeve $m$ being provided with cylindrical apertures $m^5$ it may be formed with radial grooves $m^6$, as shown in Figs. 15 and 16, to receive slides $m^7$, secured upon the bearing-ring $q$. Under normal conditions when the sleeve $j$ is locked to the sleeve $m$ and power is transmitted to the sprocket $n$ the hub and the eccentric-ring $q$ will rotate in unison about the spindle $e$; but upon depressing the clutch $o$ by any desired means so as to unlock the sleeve $j$ and the sleeve $m$ and by holding the ring $p$ stationary the sprocket $n$ and the sleeve $m$ will rotate about the sleeve $j$ on the antifriction-balls $m^2$. As the said sleeve rotates it rotates with it the eccentric-ring $q$, which in turn causes the rolls to roll around the sleeve $j$ by reason of its eccentric relationship, and since one of the rolls is journaled upon a stud extending out from the internal flange or ring of the hub the hub will be rotated with the rolls. Inasmuch, however, as the rolls do not revolve about the sleeve $j$ with the same speed that the eccentric-ring $q$ rotates the speed at which the hub is rotated is less than the speed of rotation of the sprocket-wheel. The ring $q$ operating in the nature of an eccentric, its speed of revolution about the axis of the sleeve $j$ is less than its speed of rotation about its own axis, its said speed of revolution being equal to the speed of revolution of the rolls about the axis of the sleeve $j$. Thus it will be seen that as long as the sleeve $j$ is held stationary the hub will be driven at a lower rate of speed, and that as soon as the ring $p$ is released and the clutch $o$, which connects the sleeve $j$ with the sleeve $m$, is allowed to connect the sleeve $j$ and the sprocket-wheel the friction of the connecting parts will be sufficient to cause the rolls, the eccentric, and the hub to all rotate in unison with the sprocket-wheel. The movement of the eccentric is imparted to the hub in this form of my invention through the medium of the rolls, of which one is connected to the hub; but it will be at once apparent that this might be accomplished in other ways. For instance, in Fig. 17 the eccentric $s$ is formed with external threads, on which are screwed two flanged rings $s'$ $s^2$, the latter being provided with the pins $q^2$, entering the cylindrical apertures $m^5$ in the sleeve $m$. The other ring $s'$ is formed with a hub-like flange $s^3$, on which a nut $s^4$ is screwed to form a raceway for the antifriction-balls $s^5$, which are placed between the said hub and the flange or ring $f^2$, projecting inwardly from the hub. The aperture in the ring or flange is eccentric with respect to the sleeve $j$ and is concentric with the eccentrically-arranged ring $s$. When the hub is constructed in this way and the sleeve $j$ and sprocket-wheel are connected, the eccentric and the hub and the sprocket-wheel all rotate in unison; but when the sleeve $j$ and sprocket-wheel $n$ are disconnected and the said sleeve $j$ and the bearing thereon are held stationary the rotation of the sleeve $m$ causes the rotation of the eccentric-ring, and consequently its slow revolution about the axis of the spindle, and the said bearing-ring in revolving coacts with the flange $f^2$ in rotating the hub at relatively slow rate of speed.

In Figs. 12, 13, and 14 I have illustrated the form of means which I generally prefer to employ for causing the operation of the clutch. The ring $p$ is notched, as at $p^6$, out through which the pin $o'$ projects. An arm $u$, having a hub $u'$, is secured on the spindle $c$ outside of the bicycle-fork by a lock-nut $u^2$, and projecting inward from the face of the arm are guides $u^3$ $u^3$ to receive the vertical slide $v$, on the lower end of which is a shoe $v'$, adapted to enter the notch $p^6$ and depress the clutch $o$. A spring $v^2$ is interposed between a pin $v^3$, passed through the slide, and one of the guides $u^3$ to hold the slide downward with the shoe in the notch. The rod $t^2$ is secured to the upper end of the slide and to a curved connection $t^4$, which is pivoted upon a wrist-pin $t^5$ on a lever $t^6$, fulcrumed on the bicycle-frame below the seat. By throwing the lever forward the slide is lifted out of engagement with the ring $p$ and the clutch, and by throwing it rearward the slide engages them again.

It will be observed that in the device as above described the parts that form the bearings and are likely to receive wear—such as the bearing-sleeve $l$, the sleeve or nut $j^3$, the bearing-ring $k$ and $m'$, &c.—may be all formed separately of relatively hard material, while the larger parts—such as the hub, the spindle, the sleeves $j$ and $m$, &c.—may be formed of softer and more tough material. Moreover, the parts are so constructed that they may be easily assembled together.

While under some circumstances I prefer to employ the slides or projections $m^7$, extending into the radial slots $m^6$ in the sleeve $m$, as shown in Figs. 15 and 16, yet under ordinary circumstances I prefer to employ the pins $q^2$, extending into the cylindrical apertures $m^5$ in the said sleeve $m$, since one of the pins is always in contact with the walls of its aperture, and there is consequently no backlash or lost movement of the eccentric-ring relatively to the said sleeve $m$. The function of the said sleeve is principally that of transmitting power or motion from the sprocket-wheel $n$ to the sleeve $j$ through the medium of the clutch $o$ and the ring $p$ or else to the eccentric-ring $q$ through the medium of the pins $q^2$.

I have shown the device adapted for use in connection with a hub having a sprocket-wheel to which power is transmitted from the driving-cranks by a chain; but it will of course be understood that in lieu of the sprocket-wheel I may employ a beveled gear-wheel or any other gearing that may be desired.

I may prefer to form one of the rolls as shown in Fig. 9—that is to say, I form the roll $r^3$ of a strip of spring metal wound in a tight spiral—so that in case any of the rolls or bearings wear the spring will expand and compensate therefor. This roll further causes all of the other rolls to bear firmly against their respective bearings.

One of the peculiarities of this embodiment of the invention as above described is that the speed of the driven member or hub is varied relatively to the speed of the driving member or sprocket-wheel without the aid of intermeshing gearing, and this I believe to be broadly novel. I term the mechanism for transmitting motion from the driving member to the driven member as "friction mechanism" and the eccentric-ring as the "friction-eccentric" to distinguish it from the change-speed devices in which one or more toothed rings or eccentrics intermesh with concentrically-arranged gearing for transmitting power or motion.

The rotary devices, with the graded diameters—i. e., the rolls—have imparted to them either both a movement of revolution and a movement of rotation or at times only a movement of revolution; but they transmit their movement to the driven member in any case in all of the embodiments of the invention hereinbefore described. They are positively rotated at times, and in their revolution travel in a common path about the axis of one of the members, (driving or driven,) which path is determined by the surface of one of said members with which they engage. Hence the rolls operate to impart a movement to the driven member which may be the result of their revolution or the result of their revolution and rotation both.

The invention may be expressed in other constructions, and the details thereof may be changed or varied as required.

I claim—

1. A mechanical movement comprising a driving member, a driven member, one of which is arranged eccentrically with relation to the other, and rotary devices having graded diameters arranged to maintain the eccentric relation of said members, said devices being also arranged to transmit to said driven member, either their movement of revolution or of rotation and revolution.

2. A mechanical movement comprising two members each circular in cross-section, one driving and the other driven, with rotary devices having graded diameters whereby motion may be transferred from one said member to the other, either the movement of rotation or of revolution or both of said movements of said rotary device may be transmitted to the driven member.

3. A mechanical movement comprising two members each circular in cross-section, and one within the other, and one driving and the other driven, with rotary devices traveling in a common path about the axis of one of said members, said devices having graded diameters whereby motion may be transferred from one said member to the other and an eccentric relation maintained between them.

4. A mechanical movement comprising a driving member, a driven member, an eccentric for transmitting motion to said driven member, and antifriction devices having graded diameters for maintaining said eccentric in a position eccentric to said driving member, and freely revoluble about the axis of said driving member to transmit to the driven member either their movement of rotation or of revolution or both of said movements.

5. A mechanical movement comprising a rotary member, an eccentric revoluble about the axis of the said member and controllable means for varying the speed of revolution of the eccentric independently of the speed of rotation of the said member.

6. A mechanical movement comprising a rotary member, an eccentric connected positively with said member and rotated thereby, and controllable means loose relatively to said rotary member for varying the revolutions of said eccentric about the axis of said rotary member without changing the number of its rotations.

7. A mechanical movement comprising a driving member, a driven member, one of which is eccentric to the other, and positively-rotated rotary devices freely revoluble about the axis of one of said members in a common path, and inserted between said members for transmitting movement from the driving to the driven member.

8. A mechanical movement comprising a driving member, a driven member, an eccentric for transmitting motion to said driven member, antifriction devices having graded diameters for maintaining said eccentric in a position eccentric to said driven member, and means for causing said eccentric to revolve either in unison with the rotation of the driving member, or at a different speed therefrom.

9. A mechanical movement comprising a driving member, a driven member, an eccentric for transmitting motion to said driven member, antifriction devices having graded diameters for maintaining said eccentric in a position eccentric to said driven member, a bearing-sleeve concentric with said driving member, and on which said antifriction devices are adapted to roll, and means for temporarily holding said sleeve against rotation.

10. A mechanical movement comprising a driven member, a driving member, a bearing concentric with said driven member, and antifriction devices of varying diameters inserted between said eccentric and said bearing, and means for connecting one or more of said antifriction devices with said driven member.

11. A mechanical movement comprising a rotatable driven member, a driving member, a bearing concentric with and normally rotating with the driven member, an eccentric for transmitting movement from the driving member to the driven member, antifriction devices inserted between the eccentric and the said bearing, and means for alternately holding the bearing against movement and locking it to the driving member.

12. A change-speed device for vehicles comprising a wheel-hub, a driving-wheel and friction mechanism independent of the driving-wheel interposed between said hub and said driving-wheel, for transmitting different speeds to said hub relatively to the speed of the driving-wheel.

13. A change-speed device, comprising a hub, a driving-wheel, and friction mechanism independent of said driving-wheel inside of said hub for causing said hub to rotate either in unison with the driving member or at a different speed therefrom.

14. A change-speed device comprising a hub, a driving-wheel, and friction mechanism independent of said driving-wheel located within said hub for causing said hub to rotate either in unison with the driving-wheel or at a slower speed relatively thereto.

15. A change-speed device comprising a rotating driving-wheel, a rotatory hub concentric therewith, and a friction-eccentric located within one of the said parts for imparting power from the driving-wheel to the driven hub.

16. A change-speed mechanism comprising a fixed spindle, a driving wheel or sprocket, a hub, a rotatable bearing concentric with the driven member and detachably connected with the driving-wheel, an eccentric driven by the driving-wheel revoluble rotary devices between the eccentric and the bearing for imparting motion to the hub, and means for disconnecting said bearing from the driving-wheel and holding it stationary.

17. A change-speed mechanism comprising a driven hub, a driving-wheel, a bearing-sleeve concentrically arranged in said hub, an eccentric in said hub connected therewith, antifriction devices of varying diameters interposed between said eccentric and the bearing-sleeve, a power-transmitting sleeve connected to said driving-wheel and said eccentric, a lock for said sleeves, and mechanism for operating said lock and holding said bearing-sleeve stationary.

18. A change-speed mechanism, comprising a spindle, a hub rotatable around said spindle, a bearing-sleeve on said spindle, an eccentric, antifriction-rolls of different diameters between said eccentric and the bearing-ring, means between the eccentric and the hub for causing the hub to rotate in unison with the revolutions of the eccentric, a driving-wheel, a sleeve on the first-mentioned sleeve connected to said driving-wheel for rotating the eccentric in unison with the said driving-wheel, and means for holding said bearing-sleeve stationary at will.

19. A mechanical movement comprising a driving member, an eccentric, a bearing, antifriction devices of different diameters between said eccentric and said bearing, and means of connection between said driving member and said eccentric, comprising pins projecting from one of said parts into enlarged apertures in the other of said parts.

20. A change-speed mechanism, comprising a driven hub, a driving-wheel, a spindle about which the hub and wheel rotate, a sleeve on said spindle relatively to which the wheel may rotate, a ring connected to said driving-wheel to rotate therewith, rotary devices inserted between the said sleeve and the ring, means connecting one or more of said rotary devices with the said hub, and means for temporarily holding the said sleeve against movement, whereby the revolution of the rotary devices thereabout will transmit motion from the said driving-wheel to the said hub at a reduced rate of speed.

In testimony whereof I have signed my name to this specification, in the presence of two subscribing witnesses, this 15th day of October, A. D. 1897.

VICTOR BÉLANGER.

Witnesses:
 A. D. HARRISON,
 P. W. PEZZETTI.